Aug. 7, 1962    K. P. GRABOWSKI ET AL    3,048,800
COUPLING ARRANGEMENT FOR SLOW-WAVE STRUCTURE
Filed Feb. 2, 1959    4 Sheets-Sheet 1

INVENTORS.
SAMUEL SENSIPER,
KENNETH P. GRABOWSKI,
BY
Noel B. Hammond
AGENT.

INVENTORS.
SAMUEL SENSIPER,
KENNETH P. GRABOWSKI,
BY Noel B. Hammond
AGENT.

Aug. 7, 1962  K. P. GRABOWSKI ET AL  3,048,800
COUPLING ARRANGEMENT FOR SLOW-WAVE STRUCTURE
Filed Feb. 2, 1959  4 Sheets-Sheet 3
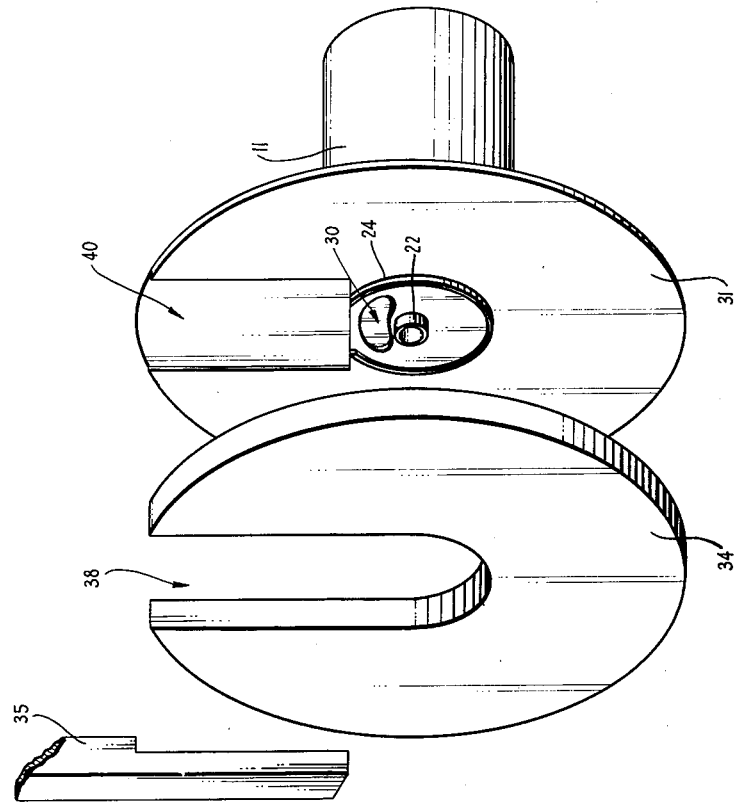
FIG. 3.
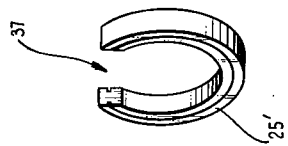
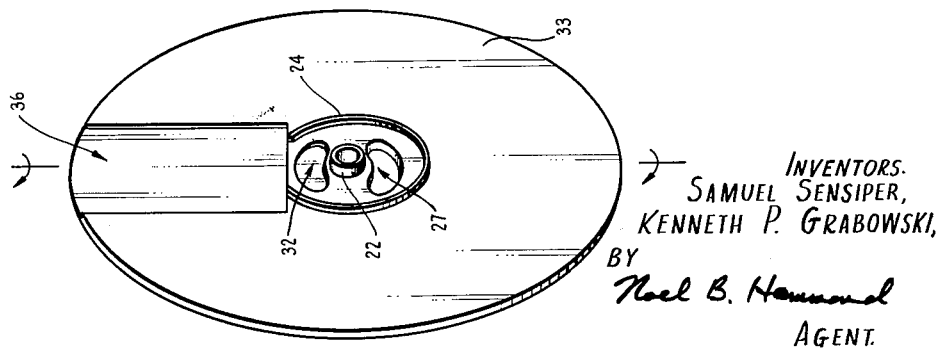
INVENTORS.
SAMUEL SENSIPER,
KENNETH P. GRABOWSKI,
BY
Noel B. Hammond
AGENT.

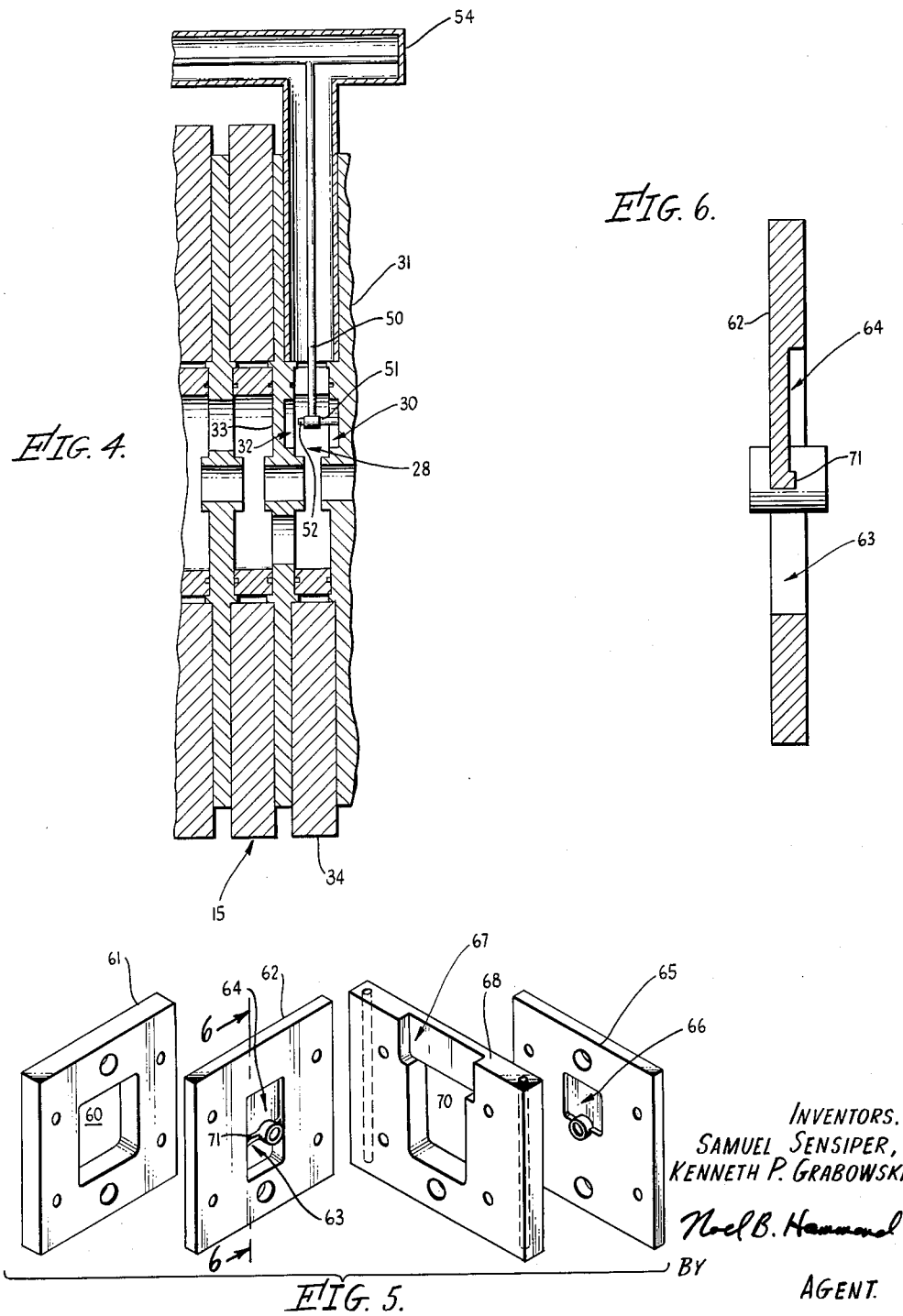

United States Patent Office 3,048,800
Patented Aug. 7, 1962

3,048,800
COUPLING ARRANGEMENT FOR SLOW-WAVE STRUCTURE
Kenneth P. Grabowski, Manhattan Beach, and Samuel Sensiper, Los Angeles, Calif., assignors to Hughes Aircraft Company, Culver City, Calif., a corporation of Delaware
Filed Feb. 2, 1959, Ser. No. 790,766
6 Claims. (Cl. 333—31)

This invention relates to traveling-wave tubes, and particularly to improved coupling arrangements for slow-wave structures for traveling-wave tubes.

In traveling-wave tubes the phase velocity of an electromagnetic wave is decreased by means of any one of a number of different types of slow-wave structures. The classical example of such structures is a helix wound about the path of the electron stream. Another type of slow-wave structure particularly useful at higher power and higher frequencies is the folded waveguide or interconnected cell type of slow-wave structure.

The present invention is primarily but not necessarily concerned with traveling-wave tubes utilizing slow-wave structures of the type last above mentioned, that is, the folded waveguide or interconnected cell type. Modern practical techniques for fabricating this type of slow-wave structure usually provide a series of interaction cells or cavities disposed adjacent each other sequentially along the axis of the tube. Each cavity is coupled to an adjacent cavity by means of a coupling hole in the end wall defining the cavity. Generally, these coupling holes between adjacent cells are alternately disposed on opposite sides of the axis.

In coupling the interconnected cell type of slow-wave structure to the input and output microwave transmission system, it is desirable to have as little reflection of energy as possible. This is particularly true in the case of high power traveling-wave tubes in order to reduce the reflected power so as to minimize or eliminate the need for internal attenuation to provide stability. Many high power traveling-wave tubes utilize the interconnected cell type of slow-wave structure.

Due to the unique configuration of the interconnected cell type of slow-wave structure, it is generally not practical to use the type of couplers used with helix-type slow-wave structures. Further, it is desirable that the coupling arrangement be simple, small, and easily manufactured with uniformity.

Accordingly, it is an object of the present invention to provide an arrangement for coupling a slow-wave structure to a microwave transmission system with a minimum of energy reflection.

Another object of the invention is the provision of a coupling arrangement suitable for use with an interconnected cell type of slow-wave structure.

Yet another object of the present invention is to provide a coupling arrangement suitable for use with an interconnected cell type of slow-wave structure of either the rectangular or circular type.

A further object of the invention is the provision of a coupling arrangement for coupling a slow-wave structure to either a waveguide or a coaxial line.

An even further object of the invention is to provide a coupling arrangement which is simple, small, and easily manufactured with uniformity.

In accordance with these and other objects of the invention, adjacent walls of the terminal cell of the slow-wave structure are provided with a pair of facing depressions disposed oppositely from the coupling aperture with respect to the central axis of the slow-wave structure. The configuration of the depressions is such as to simulate coupling apertures, and their effect is that of adding inductance in series with the slow-wave structure. The microwave transmission line is also coupled into the end cell between the two adjacent walls on the other side of the axis from the coupling aperture. The transmission line includes microwave impedance elements for matching the transmission line to the modified slow-wave structure.

In a slow-wave structure of the type having cells of a rectangular configuration, further improvement is obtained by reducing the height of the web which separates one of the simulated apertures from the coupling aperture. This has the effect of increasing the magnetic coupling between the terminal cell and the penultimate cell.

For coupling a coaxial line to a cell provided with the simulated apertures, the central conductor of the coaxial line is formed into a coupling loop and the end is fastened to the terminal wall in the center of the depression defining one of the simulated coupling apertures. The center conductor is provided with a projection which extends toward the center of the facing depression in the opposite wall. The projection acts as a capacitive reactance and increases the apparent area of the coupling loop, thus providing increased coupling.

For a better understanding of the invention, together with other and further objects thereof, reference may be made to the following description taken in connection with the accompanying drawings in which embodiments of the invention are illustrated by way of example only, like reference characters designating like parts throughout the figures thereof, and wherein:

FIG. 3 is an exploded view of a portion of the traveling-wave tube of FIG. 2, illustrating in more detail the coupling arrangement in accordance with the present invention;

FIG. 4 is a sectional view of a different form of the coupling arrangement in accordance with the present invention;

FIG. 5 is an exploded view of another exemplification of the coupling arrangement in accordance with the present invention; and FIG. 6 is a sectional view taken along the line 6—6 of a portion of the structure illustrated in FIG. 5.

Figure 1:
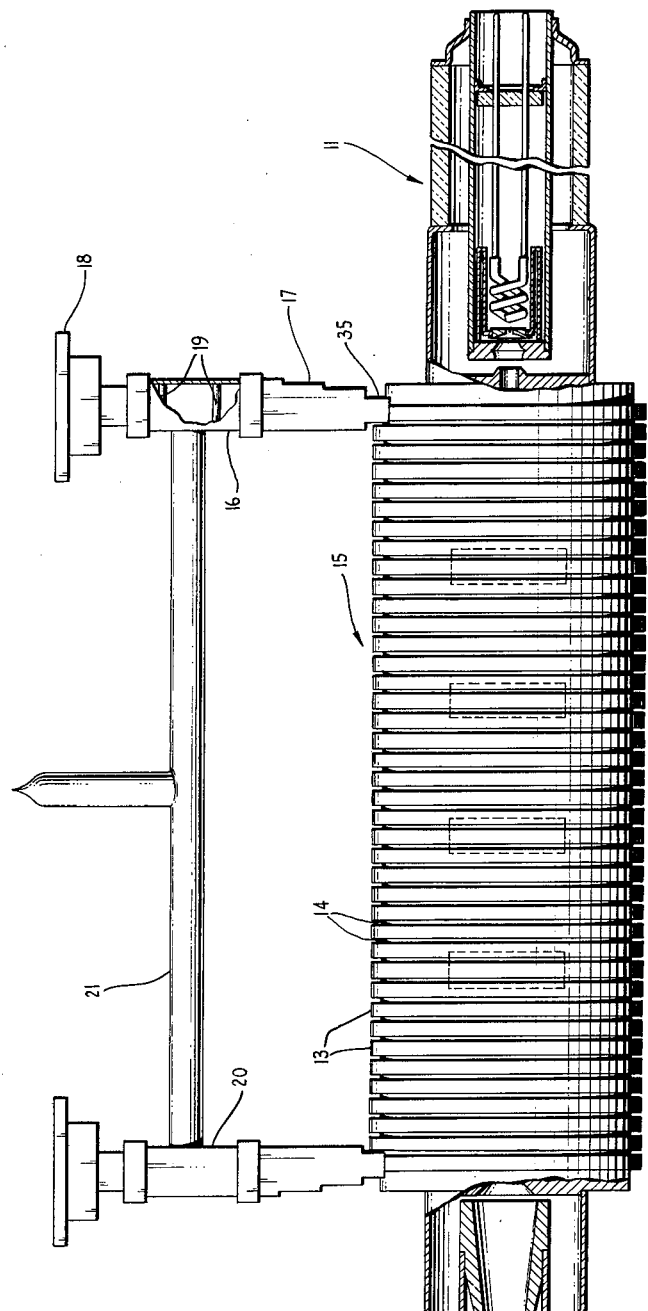
FIG. 1 is an overall view, partly in section, of a traveling-wave tube embodying a coupler in accordance with the present invention.

Referring to the drawings and their description, a number of features are shown for completeness of description of an operable traveling-wave tube according to the present invention, which features are not claimed in the present application but are claimed and described more fully in prior filed applications assigned to the assignee of the present application, for example: "Periodically Focused Traveling-Wave Tube," by D. J. Bates, H. R. Johnson, and O. T. Purl, Serial No. 764,884, filed October 2, 1958, now Patent No. 2,985,792.

Referring now to FIG. 1, there is shown a traveling-wave tube 10 having an electron gun 11 disposed at the right-hand end as shown in the drawing, and a collector electrode 12 at the left-hand end. The traveling-wave tube 10 utilizes a plurality of annular disk-shaped focusing magnets 13 assembled between adjacent ones of a series of ferro-magnetic pole pieces 14. The system of pole pieces 14 and magnets 13 form a combination slow-wave structure, periodic focusing structure, and envelope 15. Coupled to the right-hand or input end of the slow-wave structure 15 is an input waveguide transducer 16 which includes an impedance step transformer 17 and inductive matching pins 19. A flange 18 is provided for coupling the assembled traveling-wave tube 10 to an external waveguide or other microwave transmission line (not shown). At the output end of the tube 10, shown in the drawing as the left-hand end, an output transducer 20 is provided which is substantially similar to the input impedance transducer 16. An evacuation member 21 is provided for evacuating and sealing the slow-wave structure 15.

Figure 2:
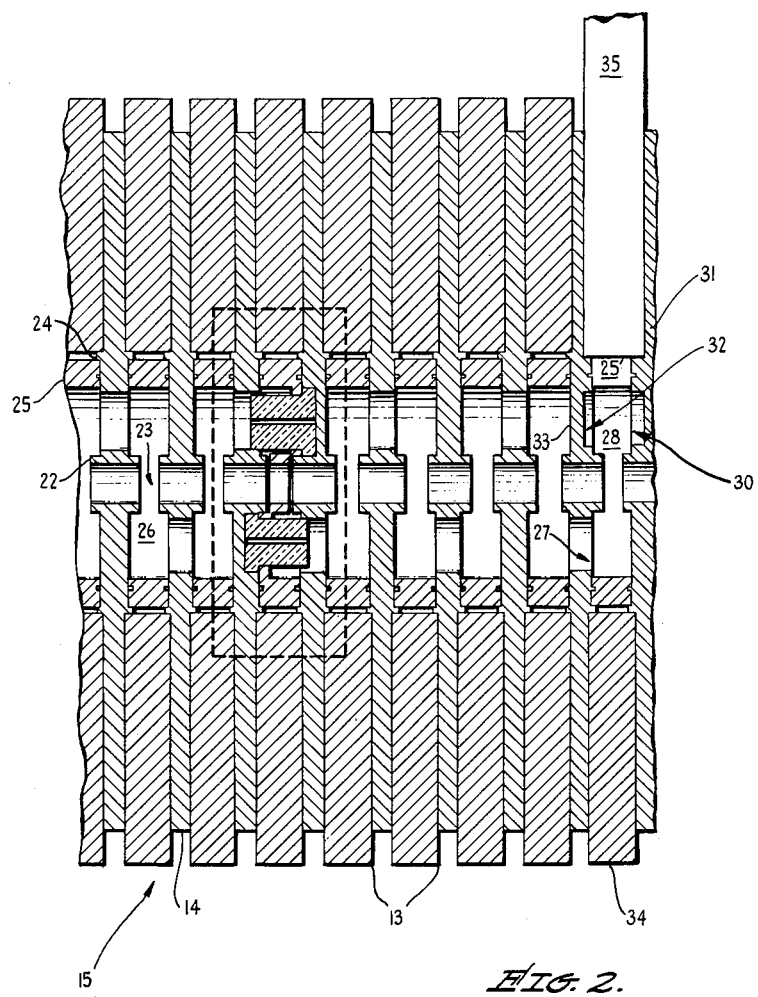
FIG. 2 is a view in section of a portion of the traveling wave tube of FIG. 1, illustrating an embodiment of the coupling arrangement in accordance with the present invention.

Referring with more particularity to FIG. 2, there is shown a detailed sectional view of a portion of the traveling-wave-tube 10 of FIG. 1. The ferro-magnetic pole pieces 14 are shown to extend radially inward to approximately the perimeter of the axial electron stream developed by the electron gun 11. Disposed contiguously about the electron stream in each case is a short drift tube 22. The drift tube 22 is in the form of a cylinder or ferrule extending axially along the stream and supported by the pole pieces 14. Adjacent ones of the drift tubes 22 are separated by a gap 23 which functions as a magnetic gap to provide a focusing lens for the electron stream and also as an electromagnetic interaction gap to provide interaction between the electron stream and microwave energy traversing the slow-wave structure 15.

At a radial distance outwardly from the drift tubes 22, each of the pole pieces 14 has a short cylindrical extension 24 protruding from its surface. The extension 24 provides an annular shoulder concentric about the axis of the traveling-wave tube 10 for aligning the assembly of the component elements of the slow-wave structure 15. Disposed radially within the extension 24 is a conductive non-magnetic circuit spacer 25 which has the form of an annular ring having an outer diameter substantially equal to the inner diameter of the cylindrical extension 24. The axial length of the spacer 25 determines the actual length of the microwave cavities 26 which are interconnected along the length of the slow-wave structure 15.

For interconnecting adjacent interaction cells a coupling hole 27 is provided in each of the ferro-magnetic pole pieces 14. Also disposed between adjacent pole pieces 14 are the focusing magnets 13 which are annular in shape and fit about the cylindrical shoulder extensions 24. The axial length of the magnets 13 is substantially equal to the axial spacing between adjacent pole pieces 14 and their radial extent is approximately equal to or may be, as shown, greater than that of the pole pieces 14. To provide the focusing lenses in the gaps 23 adjacent ones of the magnets 14 are stacked with opposite polarity, thus causing a reversal of the magnetic field at each successive lens along the tube 10.

The impedance of the slow-wave structure 15 is of such a nature that it cannot be effectively matched by use of solely external impedance-matching means such as the step transformer 17, shown in FIG. 1. Accordingly, a coupling arrangement has been provided in the slow-wave structure 15 which modifies its impedance sufficiently to permit external matching elements to reduce the VSWR (voltage standing wave ratio) to the optimum analytically predicted value.

The coupling arrangement is best seen at the right-hand end of FIG. 2. In the final cell 28, a simulated coupling aperture 30 is provided in the terminal wall 31 defining the final cell 28. The simulated aperture 30 or dummy coupling hole is of the same cross-sectional shape as the coupling aperture 27 which in the example shown is a kidney-like or arcuate oval shape. However, the simulated aperture does not extend completely through the terminal wall 31 but is merely a depression. It is disposed on the opposite side of the central axis from the coupling aperture 27 as if it were to couple into an imaginary cell adjacent the final cell 28. The effect of the simulated coupling aperture 30 is to add series inductance into the slow-wave circuit.

It has been found that increasing the depth of the simulated aperture 30 beyond a certain small amount increases the amount of inductance very little. Therefore, a second simulated aperture 32 is provided in the penultimate wall 33 of the final cell 28. This second simulated aperture 32 is similar in shape and depth to the first simulated aperture 30. The second simulated aperture 32 is also disposed on the opposite side of the central axis of the traveling wave tube 10 and faces the first simulated aperture 30.

As best seen in FIG. 3, the spacer 25' is cut away adjacent the two simulated apertures 30 and 32 to provide a passage 37 for energy to be coupled into or out of the final cell 28. The final wall 31 and the penultimate wall 33 are provided with grooves 36 and 40 and the final magnet 34 is provided with a slot 38 to permit the insertion of a short section of waveguide 35. The grooves 36 and 40 in the walls 31 and 33 and the slot 38 in the magnet 34 are made on the opposite side of the central axis from the coupling aperture 27 and adjacent the simulated apertures 30 and 32. The grooves 36 and 40 are dimensionally such as to provide a snug fit for the section of waveguide 35. The cut-away portion 37 of the spacer 25' is also of such dimensions as to permit the end of the wave-guide 35 to slip between the ends of the cut-away portion 37. The slot 38 in the magnet 34 extends radially inward from the periphery to the central hole and its width is such as to accommodate the waveguide 35.

Although the configuration of the simulated apertures 30 and 32 is shown as being identical in shape to that of the coupling aperture 27, the shape of the simulated aperture 30 and 32 may be modified within limits. That is, as long as the aperture area and the general ratio of the length and the width remains the same or nearly so, like effects will be obtained.

As stated previously, the effect of the simulated apertures 30 and 32 is to add series inductance to the slow-wave circuit. Apparently, these simulated apertures 30 and 32 act as short sections of shorted waveguide. The overall effect on the impedance or admittance of the slow-wave structure 15 is to shift the input admittance of the circuit to a favorable position in the reflection coefficient plane, as viewed on a Smith chart, so as to enable external matching elements of high power carrying capability in combination with a short length of transmission line to be used to adjust the overall impedance match of an external microwave transmission line to the optimum value for the slow-wave structure 15.

The external impedance matching element is the waveguide transducer 16 (FIG. 1) which includes a microwave step transformer 17 and a pair of inductive matching pins 19. By this means the optimum predicted impedance match has been obtained, which is on the order of a VSWR of less than 1.2 over about 80% of the frequency pass band of the slow-wave circuit itself. When in operation, the tube operates only over a portion of the frequency pass band of the slow-wave circuit. Thus, the coupling arrangement of the present invention provides an impedance match over a frequency band wider than the band of frequencies over which the tube operates.

While the detailed description of the coupling arrangement has been given with respect to the input waveguide transducer 16, it will be understood that because of the symmetry of the microwave circuit, the output transducer 20 may be provided with an identical coupling arrangement. Although the coupling arrangement has been described with reference to a particular configuration of an intercoupled cell type of slow-wave structure, it will be understood that the arrangement of the present invention may be advantageously employed in all folded guide types of coupled cavity circuits. Furthermore, the type of focusing arrangement employed will have no effect on the efficiency of the coupling arrangement and while a periodic permanent magnet type of focusing has been illustrated by way of example, non-periodic and electromagnet focusing may also be employed.

When it is desired to couple the slow-wave structure 15 to a coaxial type of microwave transmission line, a slightly different coupling arrangement is provided, as shown in FIG. 4. The final cell 28 is provided with simulated apertures 30 and 32 as in the previously described arrangement. The central conductor 50 extends into the cell 28 and turns at right angles, as illustrated at 51, thus defining what may be considered to be a coupling loop. The end of the central conductor 50 is fastened to the terminal wall 31 in the bottom of the depression which defines the first simulated aperture 30. The central conductor 50 is usually mounted in the center of the simulated aperture 30 for symmetry, but it has been found that central location is not necessary.

A projection 52 extends from the lower part of the central conductor 50 toward the center of the facing depression in the penultimate wall 33 which defines the second simulated aperture 32 but the projection 52 does not contact the wall 33. It is considered that this projection 52 acts as a so-called "tuning hat" and adds capacitance to the circuit, thereby increasing the effective area of the coupling loop, thus providing increased coupling. With this arrangement, the impedance of the slow-wave structure 15 is modified to a value which can be matched to the external coaxial line by means of a short tuning stub 54 external to the slow-wave structure 15. Because the center conductor 50 is fastened at the bottom of the tuning stub 54 and in the bottom of the first simulated aperture 30, great mechanical rigidity is provided.

In the case of an intercoupled cavity type slow-wave circuit in which the cells are of a square or rectangular configuration, the coupling arrangement will be somewhat modified, as illustrated in FIGS. 5 and 6. The cell is defined by a rectangular opening 60 in a cell-defining wall 61. The penultimate wall 62 is provided with a coupling aperture 63 and a first simulated coupling aperture 64. In this example, both the coupling aperture 63 and the simulated aperture 64 are of a rectangular configuration. In the final wall 65, a second simulated coupling aperture 66 is provided which faces the first simulated aperture 64. A slot 67 is provided in the intermediate wall 68 which defines the final cell 70, to permit coupling to a waveguide. In order to further modify the impedance of the rectangular slow-wave structure, the web 71 or boundary wall which separates the coupling aperture 63 from the simulated aperture 64 is reduced in thickness to shorten the depth of its protrusion into the final cell 70. In effect, this reduces the wall thickness between the final cell 70 and the penultimate cell and apparently increases the magnetic coupling between these two cells.

Thus, there has been described an arrangement for coupling a slow-wave structure to a microwave transmission system with minimum of energy reflection which is simple, small, and easily manufactured with uniformity.

What is claimed is:

1. An arrangement for coupling a coupled-cavity-type of traveling wave tube slow-wave structure to a microwave transmission line to minimize reflection of energy; the slow-wave structure including an end cavity partially defined by two adjacent walls disposed transversely to a central axis, one of the adjacent walls having a coupling aperture disposed between the axis and a portion of the perimeter thereof and communicating between the end cavity and the adjacent preceding cavity for coupling energy between the cavities when a wave is propagated along the slow-wave structure, the arrangement comprising a microwave impedance element electrically coupled in series between the slow-wave structure and the transmission line for increasing the effective inductance in series with the slow-wave structure, the impedance element being defined by a pair of facing depressions in the adjacent walls of the end cavity disposed oppositely from the coupling aperture with respect to the axis, the configuration of the depressions being such as to simulate coupling apertures, and a microwave transmission line coupled into the end cavity between the two adjacent walls on the side of the axis farthest from the coupling aperture, the transmission line including microwave impedance elements for matching the impedance of the transmission line to the changed effective impedance of the slow-wave structure to minimize reflection of energy.

2. In a traveling wave tube having a slow-wave structure defining a plurality of adjacent circular cells, said slow-wave structure including kidney-shaped coupling apertures for permitting the passage of an electromagnetic wave between adjacent cells, the combination with said traveling wave tube of radio frequency coupler means for coupling electromagnetic energy between an external microwave transmission means and said slow-wave structure, said coupler means comprising: a terminal wall adjacent an end wall of said slow-wave structure for defining a coupling cell, a microwave waveguide extending into said coupling cell between said terminal wall and said end wall, the end wall including a kidney-shaped coupling aperture and a kidney-shaped depression defining a simulated coupling aperture for varying the reactance of said coupling cell, said terminal wall having a kidney-shaped depression defining a simulated coupling aperture for varying the reactance of said coupling cell, said depressions being disposed opposite to each other, and a microwave waveguide extending into said coupling cell between said terminal wall and said end wall, said waveguide having reactive elements therein.

3. In a traveling-wave tube having a slow-wave structure defining a plurality of adjacent cells, said slow-wave structure including coupling apertures for permitting the passage of an electromagnetic wave between adjacent cells, the combination with said traveling-wave tube of radio frequency coupler means for coupling electromagnetic energy between an external microwave transmission means and said slow-wave structure, said coupler means comprising a terminal wall adjacent an end wall of said slow-wave structure for defining a coupling cell, said end wall having a coupling aperture and a depression defining a simulated coupling aperture for varying the reactance of said coupling cell, said terminal wall having a depression defining a simulated coupling aperture for varying the reactance of said coupling cell, said depressions being disposed opposite to each other, a coaxial transmission line having a central conductor extending into said coupling cell between said terminal wall and said end wall, said central conductor extending toward said terminal wall within said cell, the end of said central conductor being fastened to said terminal wall in the depression defining a simulated coupling aperture, said central conductor having a projection extending toward the depression defining a simulated aperture in said end wall, and a coaxial tuning stub coupled to said coaxial transmission line external to said coupling cell.

4. In a traveling-wave tube having a slow-wave structure defining a plurality of adjacent rectangular cells, said slow-wave structure including rectangular coupling apertures for permitting the passage of an electromagnetic wave between adjacent cells, the combination with said traveling-wave tube of radio frequency coupler means for coupling electromagnetic energy between an external microwave transmission means and said slow-wave structure, said coupler means comprising a terminal wall adjacent an end wall of said slow-wave structure for defining a coupling cell, said end wall having a rectangular coupling aperture and a rectangular depression defining a simulated coupling aperture for varying the reactance of said coupling cell, said terminal wall having a rectangular depression defining a simulated coupling aperture for varying the reactance of said coupling cell, said depressions being disposed opposite to each other, the surfaces of the depression in the end wall and the coupling aperture defining therebetween a boundary wall projecting into said coupling cell, the thickness of the boundary wall being less than the thickness of the end wall for decreasing the amount of projection into said coupling cell to vary the reactance of said coupling cell, and a microwave waveguide extending into said coupling cell between said terminal wall and said end wall, said waveguide having reactive elements therein.

5. In a traveling-wave tube slow-wave structure including a series of adjacent walls partially defining a plurality of adjacent microwave resonant cavity devices, each wall separating the adjacent cavities having a coupling aperture therein to permit the passage of electromagnetic energy between adjacent cavities, the coupling aperture in adjacent walls being disposed in varying positions with respect to the wall centers, the combination in the slow-wave structure of radio frequency coupler means for coupling electromagnetic energy between an external microwave transmission means and the slow-wave structure, the coupler comprising a terminal wall and a penultimate wall partially defining a coupling cavity, the penultimate wall having a coupling aperture for coupling energy between the coupling cavity and the adjacent cavity of the slow-wave structure, the terminal wall having a simulated coupling aperture disposed on the side of the terminal wall center opposite the side of the penultimate wall center in which the coupling aperture is disposed, the penultimate wall also having a simulated aperture disposed on the side of the penultimate wall center relative to the coupling aperture and facing the simulated aperture in the terminal wall, the simulated apertures appearing as reactive impedance elements for minimizing reflection losses due to impedance mismatch between the slow-wave structure and the external microwave transmission means, microwave energy transmission means communicating with the coupling cavity between the walls thereof on the side opposite the coupling aperture, and microwave impedance matching elements coupled to said transmission means external to said coupling cavity.

6. A coupling arrangement comprising: a coupled-cavity type of slow-wave structure having an end cavity partially defined by two adjacent walls disposed transversely to a central axis, one of the adjacent walls having a coupling aperture disposed between the axis and a portion of the perimeter thereof and communicating between the end cavity and an adjacent preceding cavity, the adjacent walls of the end cavity having a pair of facing depressions disposed substantially oppositely from the coupling aperture with respect to the axis, the configuration of the depressions being such as to substantially simulate coupling apertures, and external microwave transmission means coupled with the end cavity at a location disposed substantially oppositely from the coupling aperture with respect to the axis.

References Cited in the file of this patent
UNITED STATES PATENTS

| | | |
|---|---|---|
| 2,408,271 | Rigrod et al. | Sept. 24, 1946 |
| 2,504,494 | Bull | Apr. 18, 1950 |
| 2,607,849 | Purcell et al. | Aug. 19, 1952 |
| 2,720,629 | Edson et al. | Oct. 11, 1955 |
| 2,808,571 | Cohn | Oct. 1, 1957 |
| 2,915,670 | Zitelli | Dec. 1, 1959 |